March 3, 1964 — R. F. REIFERS ETAL — 3,123,519
MOLDED PULP EGG CARTON METHOD
Original Filed Aug. 26, 1958 — 2 Sheets-Sheet 1

INVENTORS
Richard F. Reifers
Henry A. Lord.
BY Karl W. Flocks
ATTORNEY

March 3, 1964   R. F. REIFERS ETAL   3,123,519
MOLDED PULP EGG CARTON METHOD

Original Filed Aug. 26, 1958

Inventors
Richard F. Reifers
Henry A. Lord
By Karl W. Flocks
Attorney

3,123,519
Patented Mar. 3, 1964

3,123,519
MOLDED PULP EGG CARTON METHOD
Richard F. Reifers, Stamford, Conn., and Henry A. Lord, Palmer, Mass., assignors to Diamond National Corporation, a corporation of Delaware
Original application Aug. 26, 1958, Ser. No. 757,309. Divided and this application June 6, 1960, Ser. No. 38,090
3 Claims. (Cl. 162—223)

The present invention relates to a molded pulp egg carton, and more particularly to a molded pulp egg carton having cells and posts, and in which the cell walls rise to the same heighth as the posts.

The present application is a division of application Serial No. 757,309, filed August 26, 1958, which in turn is a continuation-in-part of application Serial No. 717,664 of Richard F. Reifers, filed February 26, 1958, now both abandoned.

As explained in the above noted application, the marketing of eggs has undergone considerable change in recent years, so that where eggs were once sold at retail in ordinary paper bags, now special egg cartons are provided in order to minimize egg breakage, and these egg cartons are used in the packing rooms where they are filled with eggs and then sent to the retail outlet. One widely accepted type of egg carton is one that is made of molded pulp, and it is known that this egg carton is relatively rugged, inexpensive and gives substantial protection to the eggs therein.

Notwithstanding the advancement in egg carton design that has been achieved in recent years, it has been found that there is still some amount of breakage of the eggs in the molded pulp egg cartons, and this has been due to adjacent eggs striking each other during the handling of the egg carton, such as occurs in the usual shipment of the egg carton from the egg packing room to the retail outlet by truck and also during purchasing operation of the eggs at retail. It will be further noted that additional and sometimes rough handling of the egg cartons occurs during the transporting of the eggs in the egg carton by the retail customer to his home.

An object of the present invention is the provision of an egg carton of molded pulp which will prevent the striking together of adjacent eggs.

It is another object of the present invention to provide a molded pulp egg carton in which the striking together of two adjacent eggs is prevented, and at the same time the cost of the carton is not increased.

Still another object of the present invention is the provision of an egg carton having provision therein to prevent the striking together of two adjacent eggs, the construction neither unduly weakening the carton nor making the carton more expensive to produce.

A further object of the present invention is to provide a molded pulp egg carton in which adjacent eggs are prevented from striking each other regardless of the size of the egg.

Yet another object of the present invention is the provision of a molded pulp egg carton in which adjacent eggs will be prevented from striking together and in addition to provide an egg carton that is readily nestable.

A further object of the present invention is to provide a process for making an improved molded pulp egg carton in accordance with the above objects.

Another object of the present invention is the provision of a process for molding egg cartons which will result in a separator for eggs in adjacent cells that is relatively soft.

Other objects and the nature and advantages of the instant invention will be apparent from the following description taken in conjunction with the accompanying drawings, wherein.

Figure 1:
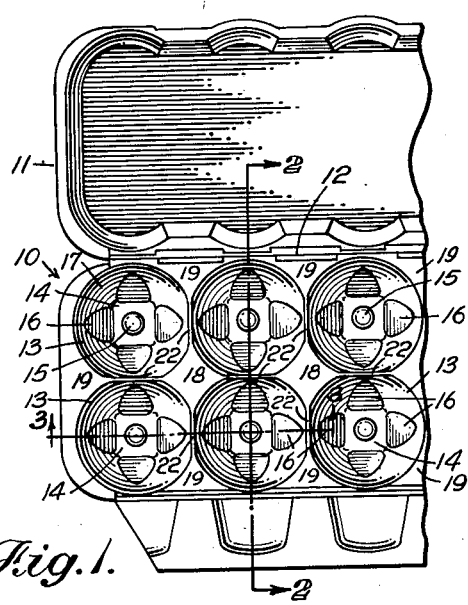
FIG. 1 is a plan view of part of an egg carton having the walls of the egg cells joined in accordance with the present invention.
Figure 5:
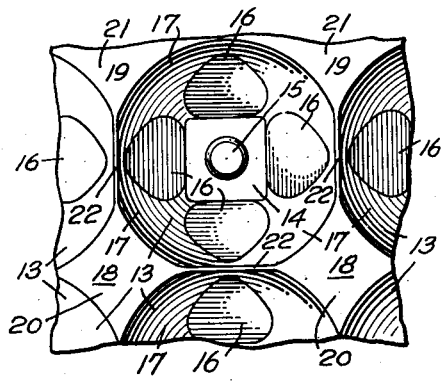
FIG. 5 is an enlarged fragmentary plan view illustrating, on a larger scale, a single egg cell and fragments of adjoining egg cells in accordance with the invention herein set forth.

Referring now to the drawings, wherein like reference characters are used to designate like or corresponding parts throughout the several views, there is shown in FIG. 1, by way of example, a cellular, pronouncedly compartmented bottom section, generally designated 10, to which a non-cellular or open-faced tray-like cover section 11 is integrally hinged by longitudinal crease 12.

The interior of bottom section 10 is partially subdivided into two rows of six egg-receiving cells 13, only six of the egg cells 13 being shown in FIG. 1. As may be seen in FIG. 2, each of the cells has a generally flat, square bottom 14 which may be provided with a centrally located upwardly extending bubble-like cushion 15. An upwardly extending and outwardly inclined wall portion 16 rises from each side of the bottom 14. These wall portions 16 merge with rounded, generally conical outwardly diverging upper cell portions 17. Obliquely of each cell 13 the upper cell portions 17 form posts 18 along the center line of the carton illustrated, and at the margins of the carton form half-posts 19. The posts 18 and the half-posts 19 have flat tops 20 and 21, respectively, and these tops 20 and 21 are substantially coplanar.

The upper cell portions 17 upwardly of the sides of one cell bottom 14, join as at 22, with the upper cell portion 17 upwardly of the side of an adjacent cell bottom 14. As may be seen from FIG. 2, the juncture 22 of the two adjacent upper cell portions 17 is substantially at the level of the plane of the tops 20 and 21 of the posts 18 and half-posts 19.

Figure 2:
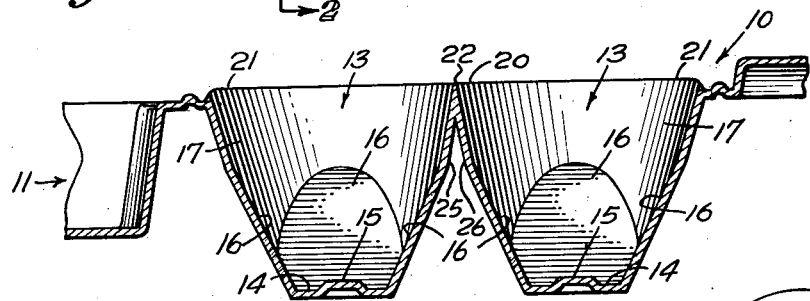
FIG. 2 is an enlarged sectional view taken on the line 2—2 of FIG. 1.

In FIG. 2, it may be seen that the exteriors 25 and 26 of adjacent upper cell portions of adjacent egg cells are separated from each other except where they join, at 22, and as above noted this juncture is substantially in the plane of the tops of the posts 18 and half-posts 19. It will be understood that this provides substantial space to permit the ready nesting of one egg carton in another.

Figure 3:
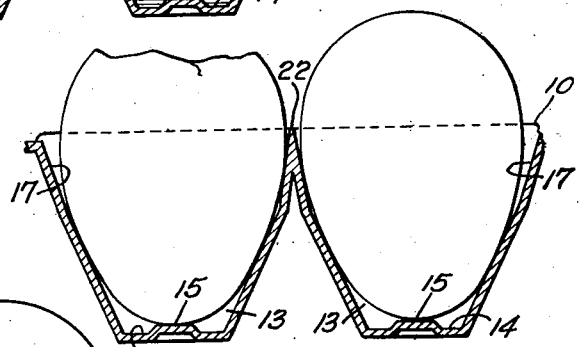
FIG. 3 is an enlarged sectional view taken on line 3—3 of FIG. 1.

In FIG. 3, it may be clearly seen that the heighth of the juncture 22 of adjacent upper cell portions 17 is such that eggs positioned in the adjacent egg cells 13 are prevented from contacting, and thus even during handling and the jostling received during transportation the eggs will be prevented from striking against each other.

Figure 4:
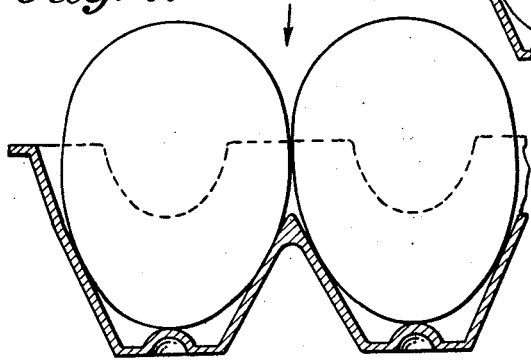
FIG. 4 is a view of a prior art egg carton, similar to the view of FIG. 3.

In FIG. 4, there is shown the disadvantage that resulted from the prior art construction and it may be clearly seen therein that the two eggs in the adjacent egg cells are free to contact and strike against each other, and it is this striking that has been found to lead to a certain amount of egg breakage.

With regard to the molding of pulp articles, it is the normal practice to provide a forming die that is shaped to the configuration of the desired article and to immerse this forming die into a slurry of water and fibers. Suction is applied to the interior of the forming die to suck the slurry against the molding or forming face of the die, the water passing through holes or apertures extending from the face of the forming die into the interior thereof. Thereafter, the forming die is removed from the slurry and the article is then usually dried and pressed between mating pressing dies. In accordance with the process of the present invention, the pressing dies have a different configuration from that of the forming die as will appear herein below.

Figure 6:
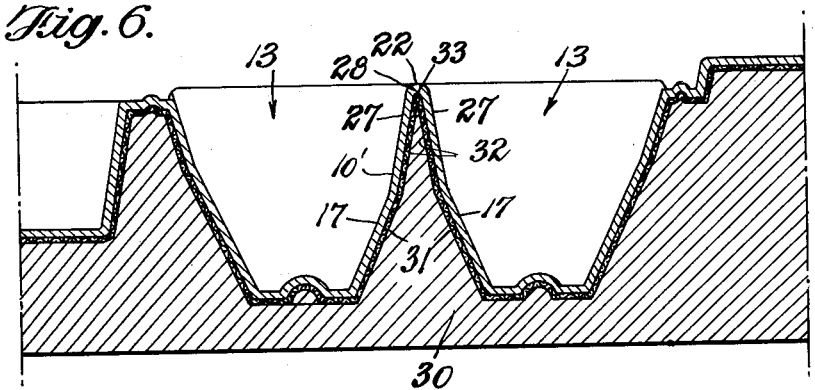
FIG. 6 is a cross-sectional view showing a forming die for carrying out a step in the process with the molded or formed egg carton thereon.

Referring now to FIG. 6, there is shown in a cross-sectional view taken similarly to the FIG. 2 view a molding die 30 having a molded pulp egg carton preform 10' thereon. The forming die 30 has egg cell forming portions 31 of adjacent egg cells 13. These portions 31 form the upper cell portions 17, and converge upwardly. Separator forming portions 32 rise abruptly at a steeper angle than the portions 31 and extend towards a summit 33 that is below the top plane of the egg carton bottom section by a thickness of the egg carton 10'.

The egg carton 10' that is molded on the forming die 30 has converging cell wall portions 17 as previously noted, and separator portions 27 extending upwardly from the wall portions 17. The separator portions extend towards a summit 22 that is approximately at the top plane of the egg carton bottom section and are spaced along their length and joined at the summit 22 by a connector portion 28.

Figure 7:
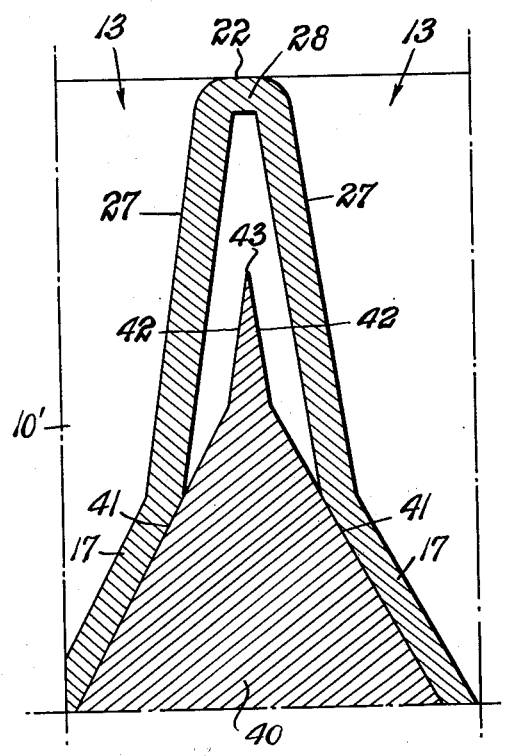
FIG. 7 is a cross-sectional view of a part of the molded egg carton placed in or on a female pressing die, illustrating another part of the process.

Once the egg carton 10' has been molded, it is placed on or in a female pressing die 40, as is shown in FIG. 7. The female pressing die 40 has egg cell portions 41 that converge upwardly at substantially the same angle as the cell forming portions 31 of the forming die 30, and these egg cell portions 41 extend to a higher relative level than the portions 31 of the forming die. Otherwise stated, the topmost part of the cell portions 41 are closer to the top plane of the egg carton bottom section than the corresponding portion 31 of the forming die 30. Female die 40 has separator forming portions 42 that rise from the topmost part of the egg cell portions 41 at an even steeper angle than the portions 41 and meet at a summit 43 that is substantially below the top plane of the egg carton bottom section and hence is relatively below the summit 33 of the forming die 30. The comparative positions of the parts of the forming die and female pressing die may be seen from a comparison of the female pressing die in FIG. 7 with the part of carton 10' shown positioned thereon, it being understood that the carton 10' accurately illustrates the shape of the forming die 30.

Figure 8:
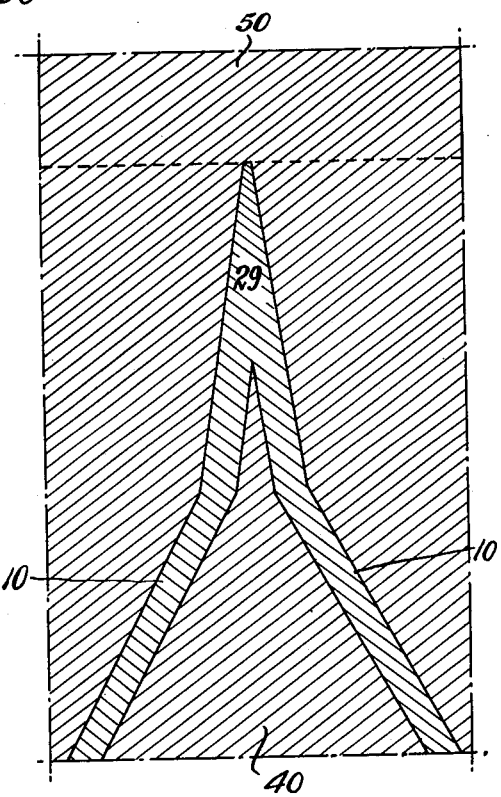
FIG. 8 is a cross-sectional view showing the pressing of the egg carton between mating pressing dies.

In FIG. 8, there is shown a cross-sectional view of the separator parts of the egg carton 10, egg carton 10 of course resulting from the pressing of egg carton 10' between the female pressing die 40 and the male pressing die 50. As may be seen by comparison between FIGS. 7 and 8, the molded pulp has been forced by the pressing dies into a different shape, and this reshaping is preferably termed "reforming." The separator portions 27 and the connector portion 28 may be seen to have been reformed into a separator 29 that has a thickness at any level that is less than the combined thickness of the separator portions 27 of the carton 10', which is the molded carton.

It will be understood that the process above described results in a separator that extends to the top plane of the egg carton bottom section and which is relatively soft, as well as compressed, to afford improved egg protection and consequently less egg breakage.

It may thus be seen that there has been provided an egg carton that obtains positive egg separation without increasing the cost of the carton and which also permits the nesting of the cartons which is so essential to the conservation of shipping space.

It will be obvious to those skilled in the art that various changes may be made without departing from the spirit of the invention and therefore the invention is not limited to what is shown in the drawings and described in the specification but only as indicated in the appended claims.

What is claimed is:

1. The method of producing nestable, molded pulp egg cartons having a cellular bottom section with an upwardly converging hollow separator portion between adjacent cells, comprising the following steps:
    (a) forming a molded pulp carton preform with a hollow separator having upwardly converging side walls and transverse connector at the upper end thereof, and in which both the interior and exterior margins and cross section through said separator walls and the shape of said separator differ distinctly from the corresponding shape and cross section of the finished egg carton ultimately produced;
    (b) mounting said egg carton preform on a female pressing die including an upper separator-forming portion extending below said preform connector and having a cross sectional dimension substantially less than the corresponding cross section of the carton preform mounted thereon and offering no direct support thereat; and
    (c) applying a male pressing die onto said carton preform and said female pressing die and simultaneously bodily horizontally displacing and compacting the converging side walls and reducing the cross section dimension between the interior and exterior margins of said separator walls and the transverse connector at the upper end thereof while eliminating no material therefrom, while maintaining the original height of the carton preform separator-forming portions, changing the orientation of the fibers in said separator to provide a modified cushioning surface on said separator, and maintaining portions of said separator walls of the finished carton at substantially the same thickness as corresponding portions of the carton preform.

2. The method of producing a molded pulp egg carton having a bottom section including at least a pair of adjacent cells in which separators between adjacent cells terminate at least in the top plane of the carton bottom section, comprising the steps of:
    (a) suction molding an egg carton preform having converging cell wall portions connected to a horizontal connector in which a closed section through the spaced separator walls and the outer shape of the separator differs materially from corresponding portions of the carton ultimately produced;
    (b) mounting said carton preform on a female pressing die comprising a lower angular cell wall forming portion substantially mating with corresponding angular preform portions including an upper separator wall forming portion having a reduced cross section considerably less than and disposed inwardly of the corresponding cross section and dimension between the inner margins of the separator walls of said preform and extending below the horizontal connector of said carton preform and offering no direct support thereat; and
    (c) applying a male pressing die on said carton preform and female pressing die and inwardly pressing and compacting said separator walls, while reducing the cross section of said horizontal connector and maintaining the height of said separator, while changing the orientation of the fibers at said separator and modifying the cushioning surface of said separator, while substantially maintaining the wall thickness of portions of said separator walls.

3. The method of claim 1 including forming said female pressing die with a lower separator forming portion engaging lower interior margins of said carton preform separator walls and substantially maintaining the originally formed shape thereat during application of said male pressing die, said upper separator forming portion of said female pressing die extending below said connector portion of said preform and converging inwardly from corresponding interior surface portions of said separator walls of said carton preform and providing no direct support during application of said male pressing die for forming the upper separator portion of the finished carton with a more pronounced degree of convergence than corresponding portions of said original carton preform.

References Cited in the file of this patent

UNITED STATES PATENTS

| | | |
|---|---|---|
| 1,433,864 | Williams | Oct. 31, 1922 |
| 2,061,064 | Reamer | Nov. 17, 1936 |
| 2,160,893 | Newsom | June 6, 1939 |

FOREIGN PATENTS

| | | |
|---|---|---|
| 492,916 | Canada | May 19, 1953 |